United States Patent
Mielenhausen et al.

(10) Patent No.: US 9,304,747 B1
(45) Date of Patent: Apr. 5, 2016

(54) AUTOMATED EVALUATION OF GRAMMARS

(71) Applicants: Bjoern Mielenhausen, Plankstadt (DE); Felix Zengerle, Karlsruhe (DE)

(72) Inventors: Bjoern Mielenhausen, Plankstadt (DE); Felix Zengerle, Karlsruhe (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 14/569,445

(22) Filed: Dec. 12, 2014

(51) Int. Cl.
*G06F 9/45* (2006.01)
*G06F 9/44* (2006.01)

(52) U.S. Cl.
CPC ... *G06F 8/42* (2013.01); *G06F 8/31* (2013.01)

(58) Field of Classification Search
CPC ..................................... G06F 8/42; G06F 8/31
USPC .......................................................... 717/143
See application file for complete search history.

(56) References Cited

U.S. PATENT DOCUMENTS

| | | | | |
|---|---|---|---|---|
| 5,903,756 A * | 5/1999 | Sankar | .................... | G06F 8/427 717/106 |
| 8,387,029 B2 * | 2/2013 | Bird | ........................ | G06F 8/427 717/139 |
| 8,849,670 B2 * | 9/2014 | Di Cristo | .............. | G06F 17/279 704/257 |
| 8,990,070 B2 * | 3/2015 | Dayan | ...................... | G06F 8/37 704/252 |

* cited by examiner

*Primary Examiner* — Anna Deng
(74) *Attorney, Agent, or Firm* — Schwegman Lundberg & Woessner, P.A.

(57) ABSTRACT

A method for automating evaluation of grammars associated with one or more programming languages is disclosed. The computer system accesses first grammar data associated with a first grammar and second grammar data associated with a second grammar, wherein a grammar comprises one or more rules that define a programming language. The computer system determines from the first grammar data and the second grammar data whether the first grammar and the second grammar correspond to the same programming language. Determining further includes applying one or more transformational steps to both the first grammar data and the second grammar data. After each transformational step, the computer system determines whether the first and second grammar data correspond. In accordance with a determination that the first grammar data and the second grammar data correspond, the computer system determines that the first and second grammar both correspond to the same programming language.

14 Claims, 9 Drawing Sheets

AUTOMATED EVALUATION OF GRAMMARS

TECHNICAL FIELD

The disclosed example embodiments relate generally to the field of programming languages and, in particular, to the field of data restoration.

BACKGROUND

The rise of the computer age has resulted in increased access to personalized services through computer networks. As the cost of electronics and networks drop, many services that were previously provided in person are now provided remotely over the Internet. For example, entertainment has increasingly shifted to the online space with companies streaming television (TV) shows and movies to members at home. Similarly, electronic mail (e-mail) has reduced the need for letters to be physically delivered. Instead, messages can be sent over networked systems almost instantly. Online social networking sites allow members to build and maintain personal and business relationships in a much more comprehensive and manageable manner.

Electronic devices (especially computer devices) require programming to perform the function for which they are intended. To allow programmers to program computers more easily and efficiently, a variety of programming languages have been developed. To enable instructions written in a programming language to be useful, the abstract instructions have to be converted into instructions that can be used by the computer device (e.g., a compiler). Each programming language has one or more grammars that describe the rules of the programming language and thus enable it to be parsed and converted into instructions that can be used by a computing device.

DESCRIPTION OF THE DRAWINGS

Some example embodiments are illustrated by way of example and not limitation in the Figures of the accompanying drawings, in which.

Like reference numerals refer to the same or similar parts throughout the drawings.

DETAILED DESCRIPTION

Figure 1:
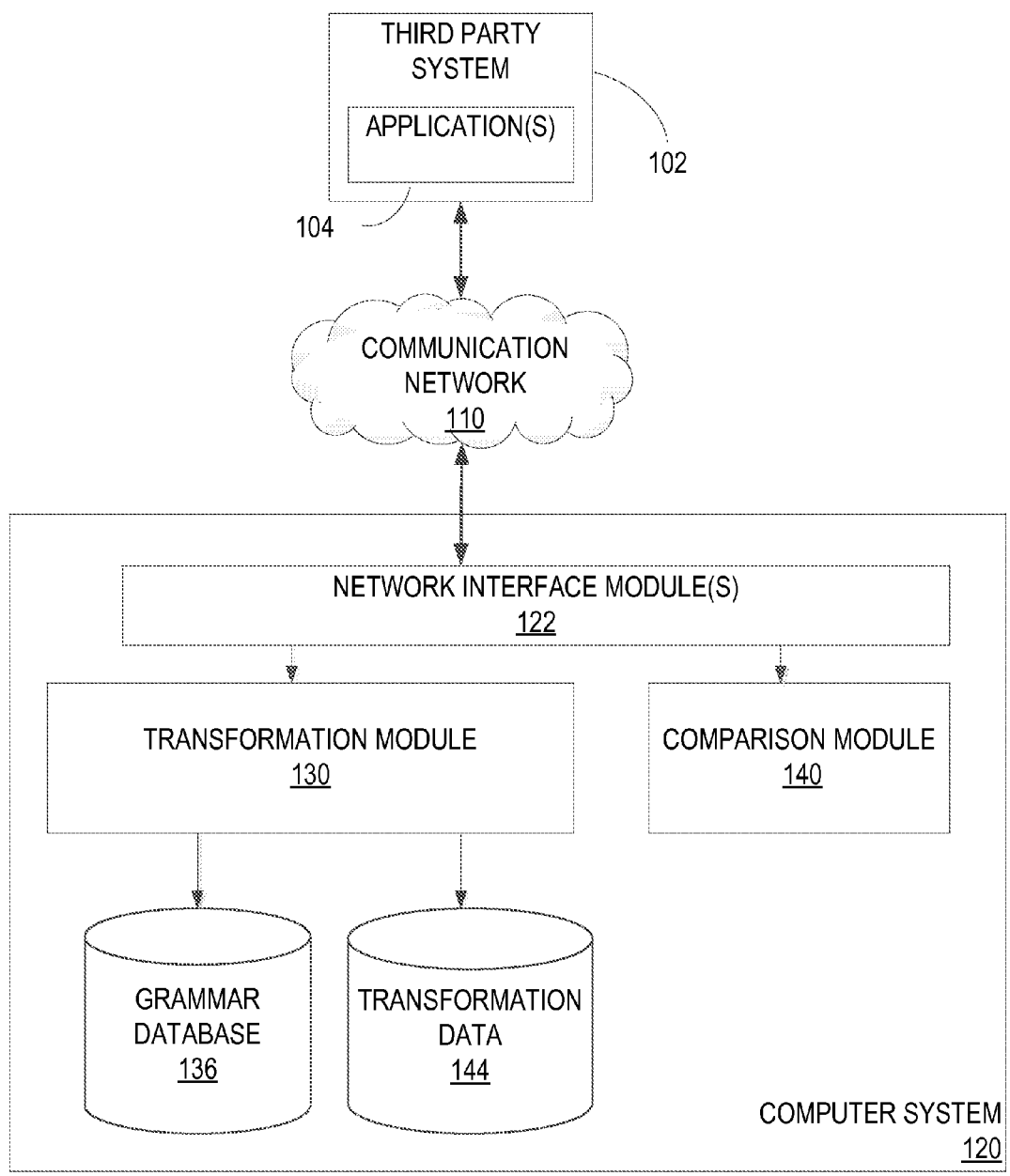
FIG. 1 is a block diagram depicting a computer system, in accordance with an example embodiment, that includes various functional components.

The present disclosure describes methods, systems, and non-transitory computer readable storage mediums storing computer program products for automatically determining whether two grammars correspond to the same programming language by performing one or more transformational steps on the two grammars and comparing them. In the following description, for purposes of explanation, numerous specific details are set forth to provide a thorough understanding of the various aspects of different example embodiments. It will be evident, however, to one skilled in the art, that any particular example embodiment may be practiced without all of the specific details and/or with variations permutations and combinations of the various features and elements described herein.

Programming languages require tools that convert abstract programming instructions, which are easier for humans to produce, to machine instructions that can be executed by a processor. In some cases, this is accomplished with the use of a grammar, which defines the syntax of a programming language with a series of rules and enables computer code (e.g., instructions written in a programming language) to be parsed by a compiler or other application and converted into machine-readable instructions. Grammars are stored and can be shared through grammar data that includes all the rules, actions, and other components needed for a grammar.

In some example embodiments, more than one grammar is produced for a particular programming language to facilitate different uses. For example, one grammar is produced for the parser of a compiler. Another grammar is produced for syntax highlighting within a coding environment. Other grammars can be produced for other purposes.

When multiple grammars exist, it is important to ensure that the grammars remain consistent with each other and continue to describe the same language accurately. As such, it is important to have methods for efficiently determining whether two or more grammars correspond to the same programming language. This could be done by checking the equivalence of both grammars. It is important to note that for some grammar types (e.g. for some context-free grammars—but not limited to this example) this it make be difficult or impossible to absolutely determine if two grammars are associated with the same language. However, it is possible to determine if the two grammars are identical. One example use case is when an update is made to a language (e.g., adding a feature) each of the grammars is updated separately. The grammars are then checked to ensure that they still refer to the same language (e.g., the changes have not moved the grammars out of synchronizations). Other use cases exist, including, but not limited to checking if two or more grammars describe the same programming language.

In some example embodiments, two or more grammars can be automatically checked to determine whether they correspond to the same programming language by performing one or more normalization transformation steps to each of the grammars. These transformational steps include removing action text from the grammars, removing attributes, removing redundant elements, alphabetizing rules, and so on. After each transformational step the grammar data associated with the grammars are accurately compared to each other to determine whether the two grammars represent the same programming language. In some example embodiments, this comparison is a character-by-character examination of the grammar data for the two grammars to determine whether the transformed grammar data is identical.

In accordance with a determination that a first grammar data and a second grammar data, after a transformation step, are identical, a computing device determines that the first and the second grammar both correspond to the same programming language (or at least a substantially similar programming language). In accordance with a determination that a first grammar and a second grammar, after a transformation step, are not identical, the computer device selects another transformation step and repeats the process. If all transformational steps have been used, the computer device determines that the first and second grammar do not correspond to the same programming language.

For the following example, define the operation $\equiv$ as equivalence check and the operation $=$ as identity check. Let $\square$ represent a transformation that doesn't affect the associated programming language when applied to a grammar. Then $\square$ can be applied to two sets of grammar data (G1 and G2) and the result can be compared. If the transformed grammar data sets are identical, the computer system (e.g., system 120 in FIG. 1) is able to determine that the two grammars are equivalent. Thus for any two grammars, G1 and G2:

$$(G1)\square=(G2)\square \rightarrow G1 \equiv G2$$

FIG. 1 is a block diagram depicting a computer system 120, in accordance with some example embodiments. The computer system 120 includes a network interface module(s) 122, a transformation module 130, and a comparison module 140. The computer system 120 also is connected to one or more third party systems 102. One or more communication networks 110 interconnect these components. The communication network 110 may be any of a variety of network types, including local area networks (LANs), wide area networks (WANs), wireless networks, wired networks, the Internet, personal area networks (PANs), or a combination of such networks.

In some example embodiments, as shown by way of example in FIG. 1, the computer system 120 generally includes three types of components, including front-end components, application logic components, and data components. As is understood by skilled artisans in the relevant computer and Internet-related arts, each module or engine shown in FIG. 1 represents a set of executable software instructions and the corresponding hardware (e.g., memory and processor) for executing the instructions. To avoid unnecessary detail, various functional modules and engines that are not germane to conveying an understanding of the various example embodiments have been omitted from FIG. 1. However, a skilled artisan will readily recognize that various additional functional modules and engines may be used with a computer system 120, such as that illustrated in FIG. 1, to facilitate additional functionality that is not specifically described herein. Furthermore, the various functional modules and engines depicted in FIG. 1 may reside on a single server computer or may be distributed across several server computers in various arrangements. Moreover, although depicted in FIG. 1 as a three-component type of architecture, the various example embodiments are by no means limited to this architecture.

As shown by way of example in FIG. 1, the computer system 120 includes a network interface module(s) (e.g., a web server) 122, which receives data and/or requests from various third party systems 102, and communicates data back to the appropriate third party systems 102 when appropriate.

For example, the network interface module(s) 122 receives a request to compile a set of computer instructions. In other example embodiments, the request includes two or more grammars with a request to determine whether the two grammars correspond to the same programming language.

As shown by way of example in FIG. 1, the data components include a grammar database 136 for storing grammar data and any related information and transformation data 144 for storing information on how to accomplish each normalization transformation step. It should be noted, that in this application, database is used to refer to any method or type of data storage or retention and is not limited to formal databases. Thus, any data structure or format may be used to hold the data in grammar database 136 or transformation data 144. The application logic components include a transformation module 130 and a comparison module 140.

The transformation module 130 applies one or more transformational steps to two or more target grammars. In some example embodiments, each transformational step alters the text of the grammar (or other representation of the grammar, such as a visual non-text related representation) in the interest of stripping out non-essential information and/or standardizing the data in the grammar. For example, a transformational step can include alphabetizing the list of rules. In other examples, a transformational step includes removing redundant elements from the grammar.

In some example embodiments, the grammar data this is transformed is accessed from the grammar database 136. In other example embodiments, the grammar data is received from a third party system 104. In some example embodiments, each transformational step is based on data stored with the transformation data 144.

In some example embodiments, the comparison module 140 compares two or more grammars after each transformational step. In some example embodiments, the comparison module 140 compares the two or more grammars to determine whether the first grammar and second grammar are exactly the same. If the comparison module 140 determines that the first grammar and the second grammar refer to the same programming language.

Figure 2:
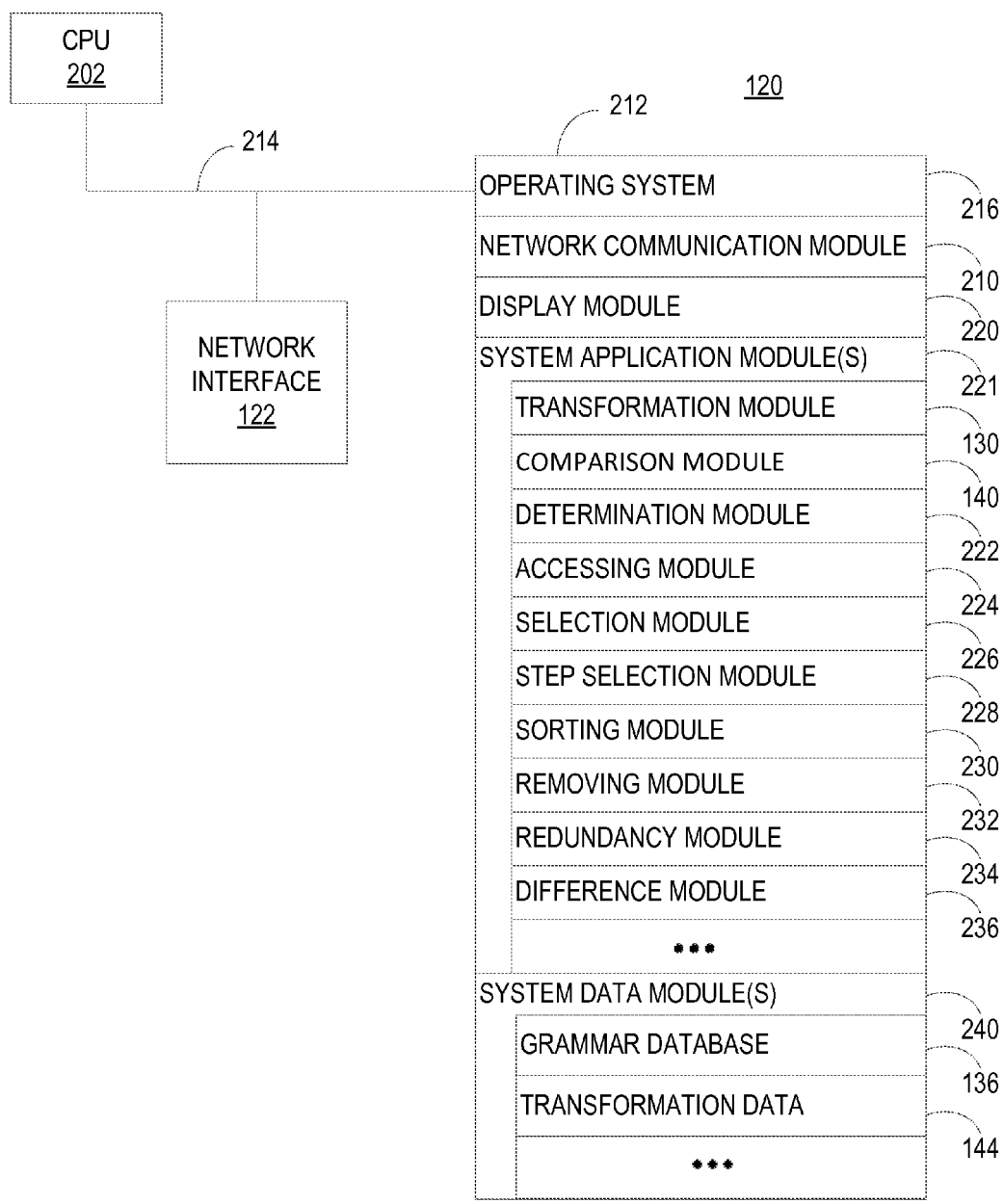
FIG. 2 is a block diagram illustrating a computer system, in accordance with some example embodiments.

FIG. 2 is a block diagram further illustrating the computer system 120, in accordance with some example embodiments. The computer system 120 typically includes one or more processing units (CPUs) 202, one or more network interfaces 122, memory 212, and one or more communication buses 214 for interconnecting these components.

Memory 212 includes high-speed random access memory, such as Dynamic Random Access Memory (DRAM), Static Random Access Memory (SRAM), Double Data Rate Random Access Memory (DDR RAM) or other random access solid state memory devices; and may include non-volatile memory, such as one or more magnetic disk storage devices, optical disk storage devices, flash memory devices, or other non-volatile solid state storage devices. Memory 212 may optionally include one or more storage devices remotely located from the CPU(s) 202. Memory 212, or alternately the non-volatile memory device(s) within memory 212, comprises a non-transitory computer readable storage medium.

Figure 3:
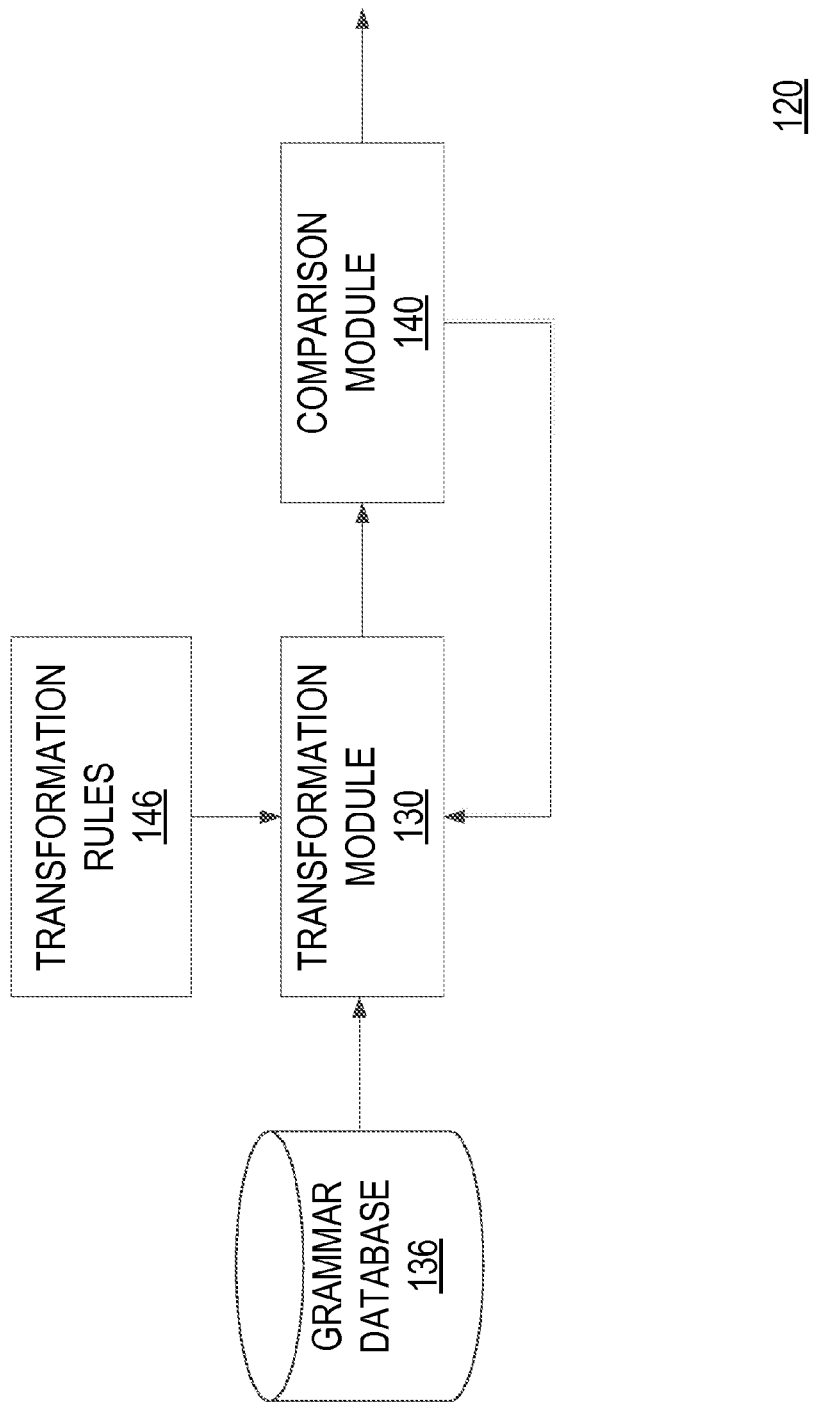
FIG. 3 depicts a block diagram illustrating at least some components of a computer system, in accordance with some example embodiments.

In some example embodiments, memory 212 or the computer readable storage medium of memory 212 stores the following programs, modules, and data structures, or a subset thereof:

- an operating system 216 that includes procedures for handling various basic system services and for performing hardware dependent tasks;
- a network communication module 210 that is used for connecting the computer system 120 to other computers via the one or more network interface module(s) 122 (wired or wireless) and one or more communication networks (e.g., communication network 110), such as the Internet, other WANs, LANs, metropolitan area networks, etc.;

a display module 220 for enabling the information generated by the operating system 216 to be presented visually as needed;

one or more system application modules 221 for handling various aspects of storing and recovering data, including but not limited to:

- a transformation module 130 for applying one or more transformational steps to two or more grammars;
- a comparison module 140 for comparing the text of two or more grammars to determine whether the two or more grammars correspond (e.g., are a match);
- a determination module 222 for determining whether the two or more grammars correspond to the same programming language;
- an accessing module 224 for accessing one or more grammars from a third party system 102 or from local memory;
- a selection module 226 for selecting a next transformational step from one or more transformational steps;
- a step selection module 228 for determining whether there are any remaining (e.g., not already applied to the current grammars) transformational steps in the one or more transformational steps;
- a sorting module 230 for sorting one or more rules based on a previously determined sorting criteria;
- a removing module 232 for removing one or more actions from the first and second grammars;
- a redundancy module 234 for identifying and removing redundant portions of a grammar; and
- a difference module 236 for identifying differences between two or more grammars and determining that the two or more grammars do not correspond to the same programming language; and a system data module(s) 240 for storing data at the computer system 120, including but not limited to:

- a grammar database 136 for storing a plurality of grammars that define one or more programming languages; and
- transformation data 144 for storing data needed to perform one or more transformations on grammars FIG. 3 depicts a block diagram of at least some components of computer system 120, in accordance with some example embodiments. In accordance with some example embodiments, two or more grammars are retrieved from a grammar database 136. In some example embodiments, the two or more grammars were originally received from an outside system (e.g., third-party system 102 in FIG. 1).

In some example embodiments, transformation module 130 then applies one or more transformation steps to the two or more grammars. Each transformation step is based on transformation rules 146 that inform how each transformation step is to be completed. The transformation module 130 selects a transformation step from one or more possible transformation steps.

In some example embodiments, one or more of the transformation steps have a structured order. For example, some transformation steps always have to be completed before other transformation steps. For example, one transformation rule sorts the rules in the grammar based on alphabetical order. Another transformation rule generates a standardized name for rules in the grammar. In some example embodiments, the rule name is standardized prior to ordering the rules alphabetically. Thus, the transformation module 130 will never select the alphabetizing step without first generating standardized rule names.

Once the two or more grammars have been transformed, the resulting transformed two or more grammars are then sent to the comparison module 140. The comparison module 140 compares the transformed grammar. In some example embodiments, comparing the two or more transformed grammars includes comparing the two grammars for an exact match (e.g., character by character comparison). The comparison module 140 determines whether the resulting transformed grammars correspond to each other (e.g., match).

In accordance with a determination that the two or more transformed grammars correspond, the comparison module 140 determines that the two or more transformed grammars correspond to the same programming language. In accordance with a determination that the two or more transformed grammars do not correspond to each other (e.g., match or have substantial similarity), the comparison module 140 sends the two or more grammars back to the transformation module 130 for additional transformation steps.

Figure 4:
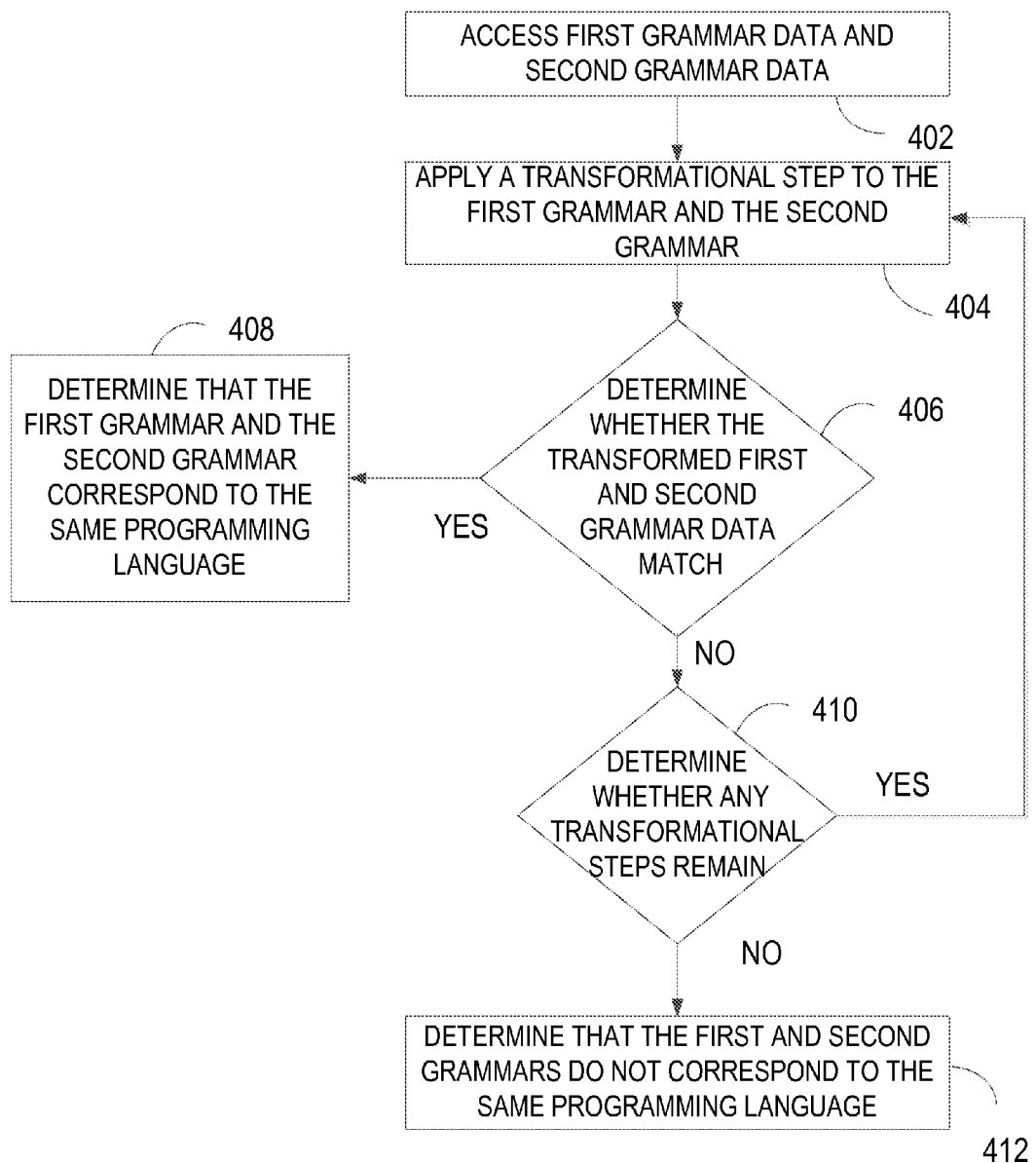
FIG. 4 is a flow diagram illustrating a method, in some example embodiments, for automatically determining whether two grammars correspond to the same programming language by performing a series of transformational steps on the two grammars.

FIG. 4 is a flow diagram illustrating a method 400, in some example embodiments, for automatically determining whether two grammars correspond to the same programming language by performing a series of transformational steps on the two grammars. Each of the operations shown in FIG. 4 may correspond to instructions stored in a computer memory or computer-readable storage medium. Optional operations are indicated by dashed lines (e.g., boxes with dashed-line borders). In some implementations, the method 400 described in FIG. 4 is performed by the computer system 120 shown in FIG. 1. However, other systems and configurations can be used to implement the method 400 described in FIG. 4.

In some implementations, the method 400 is performed at a computer system (e.g., computer system 120 in FIG. 1) including one or more processors and memory storing one or more programs for execution by the one or more processors.

The computer system (e.g., system 120 in FIG. 1) accesses (402) first grammar data and second grammar data. Grammar data can include data in any from that represents a grammar and the rules that the grammar includes including a file, data stored in memory, entries in a database, and so on. In some example embodiments, the first grammar data and second grammar data are accessed after being received from another computer system (e.g., third-party system 102 in FIG. 1). In some example embodiments, the first grammar data and second grammars data are accessed as part of a request to determine whether the corresponding first and second grammars correspond to the same programming language. In other example embodiments, the first grammar data and the second grammar data are accessed when changes are made to both grammars and verification is then needed to ensure that the two grammars have remained consistent.

In some example embodiments, the computer system (e.g., system 120 in FIG. 1) applies (404) a transformational step to the first grammar data and the second grammar data. A transformational step includes an automated change to both the first grammar data and the second grammar data in an attempt to standardize the two grammars. For example, one transformational step would be to sort all the rules in a grammar alphabetically. In some example embodiments, grammars, depending on their specific purpose, include action instructions that cause specific results when parsing a program (e.g., compilers generate machine code, syntax highlighters highlight elements in code, and so on). These action instructions differ between grammars that are associated with the same programming language but are intended for distinct purposes.

Thus, removing the action instructions allows the two grammars to be compared without the use-specific additions.

In some example embodiments, the computer system (e.g., system 120 in FIG. 1) determines (406) whether the transformed first grammar data and second grammar data correspond sufficiently (e.g., whether the text of the first grammar data after the transformational step is the same as the text of the second grammar data after the transformational step). In accordance with a determination that the first grammar data and the second grammar data correspond after the transformational step, the computer system (e.g., system 120 in FIG. 1) determines (408) that the first grammar data and the second grammar data are associated with the same programming language.

In accordance with a determination that the first grammar data and the second grammar data do not correspond (e.g., do not match or have sufficient similarity) after the transformational step, the computer system (e.g., system 120 in FIG. 1) determines (410) whether there are any remaining transformational steps that have not yet been applied to the first grammar data and the second grammar data. In accordance with a determination that there is at least one remaining transformational steps that has not yet been applied to the first grammar data and the second grammar data, the computer system (e.g., system 120 in FIG. 1) then applies (404) a transformational step and begins the process of comparing again. In accordance with a determination that there are no remaining transformational steps that have not yet been applied to the first grammar data and the second grammar data, the computer system (e.g., system 120 in FIG. 1) determines (412) that the first grammar and the second grammar do not correspond to the same programming language.

Figure 5A:
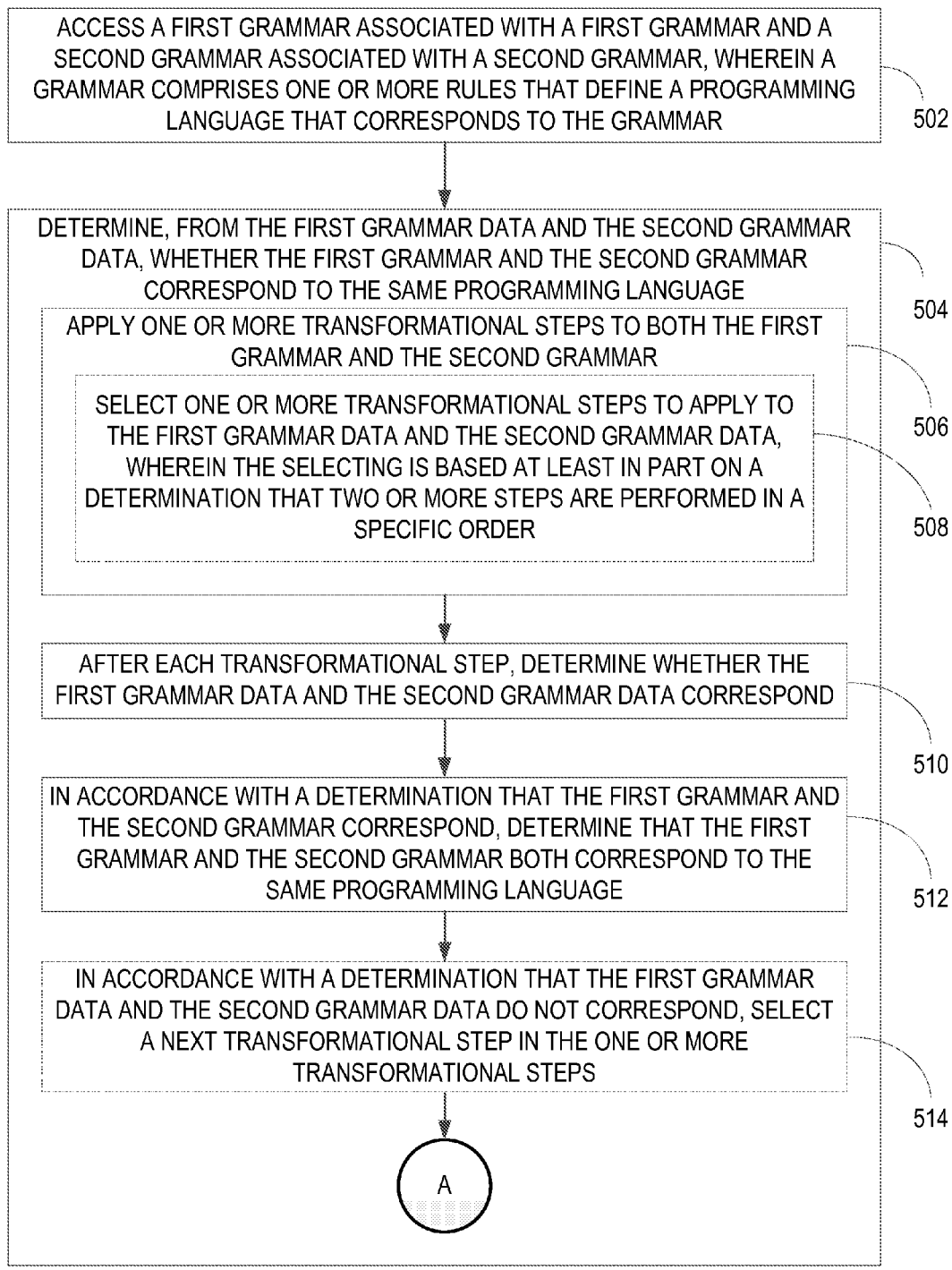
FIGS. 5A and 5B are flow diagrams illustrating a method, in accordance with some implementations, for automatically determining whether two grammars correspond to the same programming language by performing a series of transformational steps on the two grammars.

FIG. 5A is a flow diagram illustrating a method, in accordance with some implementations, for automatically determining whether two grammars correspond to the same programming language by performing a series of transformational steps on the two grammars. Each of the operations shown in FIG. 5A may correspond to instructions stored in a computer memory or computer readable storage medium. Optional operations are indicated by dashed lines (e.g., boxes with dashed-line borders). In some implementations, the method described in FIG. 5A is performed by the computer system (e.g., system 120 in FIG. 1). However, the method described can also be performed by any other suitable configuration of electronic hardware.

In some implementations the method is performed at a computer system (e.g., system 120 in FIG. 1) including one or more processors and memory storing one or more programs for execution by the one or more processors.

In some example embodiments, a computer system (e.g., system 120 in FIG. 1) accesses (502) first grammar data associated with a first grammar and second grammar data associated with a second grammar, wherein a grammar comprises one or more rules that define a programming language that corresponds to the grammar. In some example embodiments, the grammars are accessed after they are received from an outside source (e.g., third party system 102 in FIG. 1). However, in other example embodiments, the first and second grammar data are generated internally based on the same language but for different purposes (e.g., a compiler or a syntax highlighter). After updates are made to the first and second grammar data (e.g., when the language has a feature added) it is important to ensure that the grammar data still accurately represent the programming language.

In some example embodiments, the computer system (e.g., system 120 in FIG. 1) determines (504), based on the first grammar data and the second grammar data, whether the first grammar and the second grammar correspond to the same programming language. In some example embodiments, determining whether the first grammar and the second grammar correspond to the same programming language includes applying (506) one or more transformational steps to both the first grammar data and the second grammar data.

Each transformational step includes editing the file associated with a grammar to generalize the grammar and remove non-essential attributes of the grammar. In some example embodiments, the one or more transformational steps include removing all actions from the first grammar data and the second grammar data. In some example embodiments, the one or more transformational steps include sorting the rules in the first grammar data and the second grammar data alphabetically.

In some example embodiments, the one or more transformational steps include removing redundant parentheses from both the first grammar data and the second grammar data. In some example embodiments, the one or more transformational steps include renaming all the rules in the first grammar data and the second grammar data according to a predetermined naming method.

In some example embodiments, the one or more transformational steps include sorting all deterministic alternatives in accordance with a predetermined sorting method.

In some example embodiments, the one or more transformational steps include two or more steps that are performed in a specific order. For example, the first transformational step includes generating new names for rules based on a standard name generating and a second transformational step includes sorting the rules alphabetically. It is therefore important to generate new names prior to sorting so that the alphabetized order will not be changed.

In some example embodiments, the computer system (e.g., system 120 in FIG. 1) selects (508) one or more transformational steps to apply, wherein the selecting is based at least in part on a determination that two or more steps are performed in a specific order.

In some example embodiments, after each transformational step, the computer system (e.g., system 120 in FIG. 1) determines (510) whether the first grammar and the second grammar correspond to each other (e.g., they match or have sufficient similarity). In some example embodiments, determining whether the first grammar and the second grammar correspond comprises determining whether the first grammar is an exact text match for the second grammar.

In some example embodiments, in accordance with a determination that the first grammar data and the second grammar data correspond, the computer system (e.g., system 120 in FIG. 1) determines (512) that the first grammar and the second grammar both correspond to the same programming language.

In some example embodiments, in accordance with a determination that the first grammar and the second grammar do not correspond, the computer system (e.g., system 120 in FIG. 1) selects (514) a next transformational step in the one or more transformational steps.

Figure 5B:
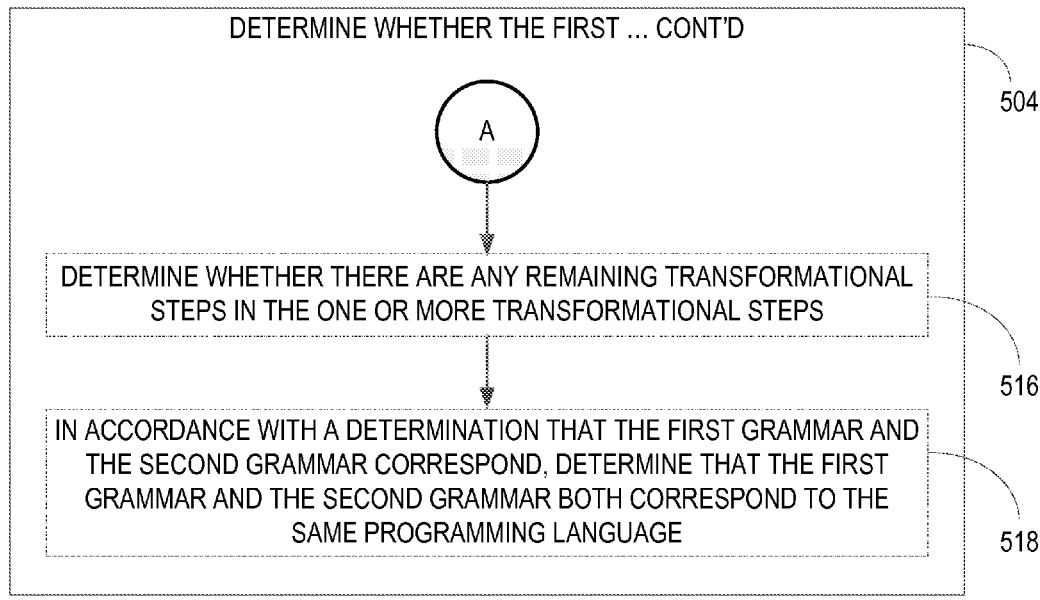

FIG. 5B is a flow diagram illustrating a method, in accordance with some implementations, for automatically determining whether two grammars correspond to the same programming language by performing a series of transformational steps on the two grammars. Each of the operations shown in FIG. 5B may correspond to instructions stored in a computer memory or computer readable storage medium. Optional operations are indicated by dashed lines (e.g., boxes with dashed-line borders). In some implementations, the method described in FIG. 5B is performed by the computer system (e.g., system 120 in FIG. 1). However, the method described can also be performed by any other suitable configuration of electronic hardware.

In some implementations the method is performed at a computer system (e.g., system 120 in FIG. 1) including one or more processors and memory storing one or more programs for execution by the one or more processors.

In some example embodiments, the computer system (e.g., system 120 in FIG. 1) determines (516) whether there are any remaining transformational steps in the one or more transformational steps. In accordance with a determination that there are not remaining transformation steps, the computer system (e.g., system 120 in FIG. 1) determines (518) that the first grammar and the second grammar do not correspond to the same programming language.

Figure 6:
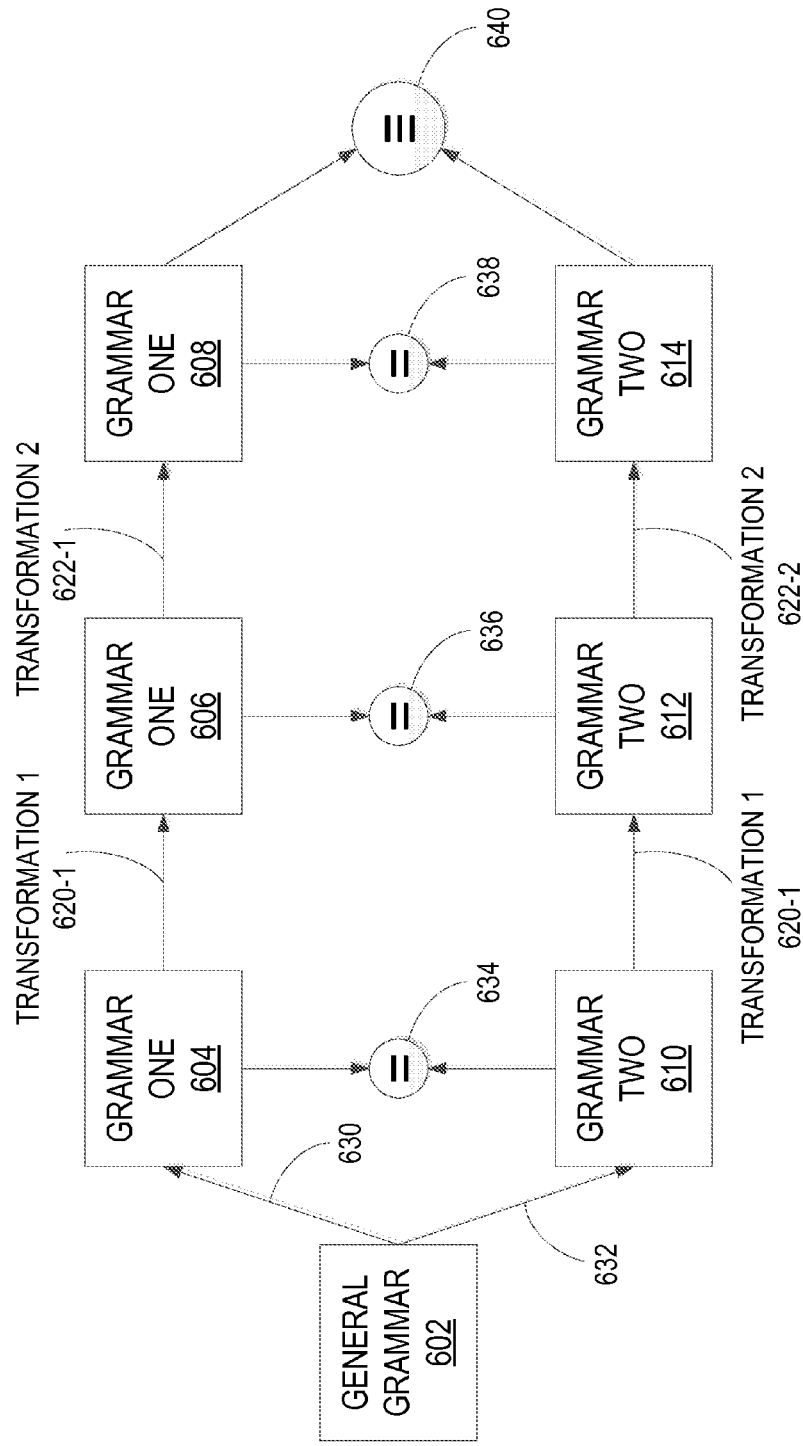
FIG. 6 is a block diagram illustrating a method, in accordance with some implementations, for automatically determining whether two grammars correspond to the same programming language by performing a series of transformational steps on the two grammars.

FIG. 6 is a block diagram illustrating a method, in accordance with some implementations, for automatically determining whether two grammars correspond to the same programming language by performing a series of transformational steps on the two grammars. Each step shown in FIG. 6 may correspond to instructions stored in a computer memory or computer readable storage medium. Optional operations are indicated by dashed lines (e.g., boxes with dashed-line borders). In some implementations, the method described in FIG. 6 is performed by the computer system (e.g., system 120 in FIG. 1). However, the method described can also be performed by any other suitable configuration of electronic hardware.

In some implementations the method is performed at a computer system (e.g., system 120 in FIG. 1) including one or more processors and memory storing one or more programs for execution by the one or more processors.

In some example embodiments, a general grammar 602 is generated and represents a programming language. The general grammar 602 is then used to generate (630 and 632) two specialized grammars 604 and 610 (e.g., for compiling, syntax highlighting, and so on). Thus, grammar one 604 and grammar 610 both include task specific actions and other details that distinguish the two grammars.

In some example embodiments, grammar one 604 and grammar two 610 are compared 634. In some example embodiments, this comparison determines whether grammar one 604 and grammar two 610 are an exact text match. In some example embodiments, in accordance with a determination that the first grammar and the second grammar are an exact text match 634, the computer system (e.g., system 120 in FIG. 1) determines that the two grammars are equivalent 640.

In accordance with a determination that the first grammar and the second grammar are not an exact text match 634, the computer system (e.g., system 120 in FIG. 1) then applies a first transformation 620-1 to grammar one to generate a transformed grammar one 606 and the same first transformation 620-2 to the second grammar 610 to generate a transformed grammar two 612. Transformation 1 includes one or more transformations that do not affect the according language of the grammar.

In some example embodiments, the transformed grammar one 604 and the transformed grammar two are compared again 636. As before, if the two transformed grammars are a match (or correspond significantly), the two grammars are determined to be equivalent. If not, a transformation 2 (622-1 and 622-2) is applied to produce transformed grammar one 608 and transformed grammar two 614. These transformed grammars are compared again 638. Additional transformation steps can be used if a match is not found. Ultimately if all possible transformation steps have been used and no matches are found, then grammar one and grammar two are determined not be substantially equivalent.

Software Architecture

Figure 7:
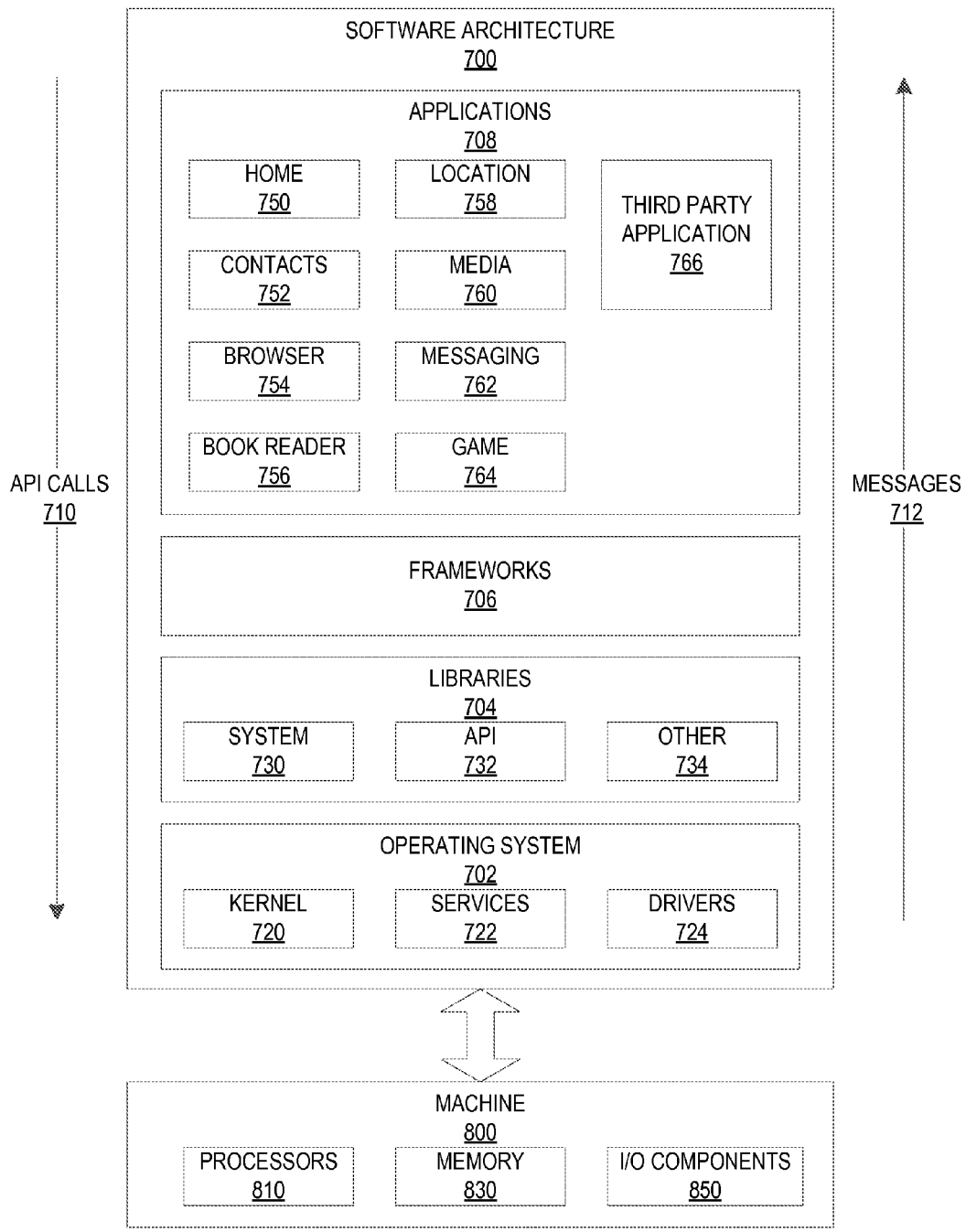
FIG. 7 is a block diagram illustrating an architecture of software, which may be installed on any one or more of devices a computer system.

FIG. 7 is a block diagram illustrating an architecture of software 700, which may be installed on any one or more of the devices of FIG. 1 (e.g., computer system 120). FIG. 7 is merely a non-limiting example of a software architecture that can be used in various computer systems described herein (e.g., computer system seen in FIG. 2 and it will be appreciated that many other architectures may be implemented to facilitate the functionality described herein. The software 700 may be executing on hardware such as machine 800 of FIG. 8 that includes processors 810, memory 830, and I/O components 850. In the example architecture of FIG. 7, the software 700 may be conceptualized as a stack of layers where each layer may provide particular functionality. For example, the software 700 may include layers such as an operating system 702, libraries 704, frameworks 706, and applications 708. Operationally, the applications 708 may invoke application programming interface (API) calls 710 through the software stack and receive messages 712 in response to the API calls 710.

The operating system 702 may manage hardware resources and provide common services. The operating system 702 may include, for example, a kernel 720, services 722, and drivers 724. The kernel 720 may act as an abstraction layer between the hardware and the other software layers. For example, the kernel 720 may be responsible for memory management, processor management (e.g., scheduling), component management, networking, security settings, and so on. The services 722 may provide other common services for the other software layers. The drivers 724 may be responsible for controlling and/or interfacing with the underlying hardware. For instance, the drivers 724 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth.

The libraries 704 may provide a low-level common infrastructure that may be utilized by the applications 708. The libraries 704 may include system libraries 730 (e.g., C standard library) that may provide functions such as memory allocation functions, string manipulation functions, mathematic functions, and the like. In addition, the libraries 704 may include API libraries 732 such as media libraries (e.g., libraries to support presentation and manipulation of various media format such as MPREG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 704 may also include a wide variety of other libraries 734 to provide many other APIs to the applications 708.

The frameworks 706 may provide a high-level common infrastructure that may be utilized by the applications 708. For example, the frameworks 706 may provide various graphic user interface (GUI) functions, high-level resource management, high-level location services, and so forth. The frameworks 706 may provide a broad spectrum of other APIs that may be utilized by the applications 708, some of which may be specific to a particular operating system or platform.

The applications 708 include a home application 750, a contacts application 752, a browser application 754, a book reader application 756, a location application 758, a media application 760, a messaging application 762, a game application 764, and a broad assortment of other applications such as third party application 766. In a specific example, the third party application 766 (e.g., an application developed using the Android™ or iOS™ software development kit (SDK) by an entity other than the vendor of the particular platform) may be mobile software running on a mobile operating system such as iOS™, Android™, Windows® Phone, or other mobile operating systems. In this example, the third party application 766 may invoke the API calls 710 provided by the mobile operating system 702 to facilitate functionality described herein.

Example Machine Architecture and
Machine-Readable Medium

Figure 8:
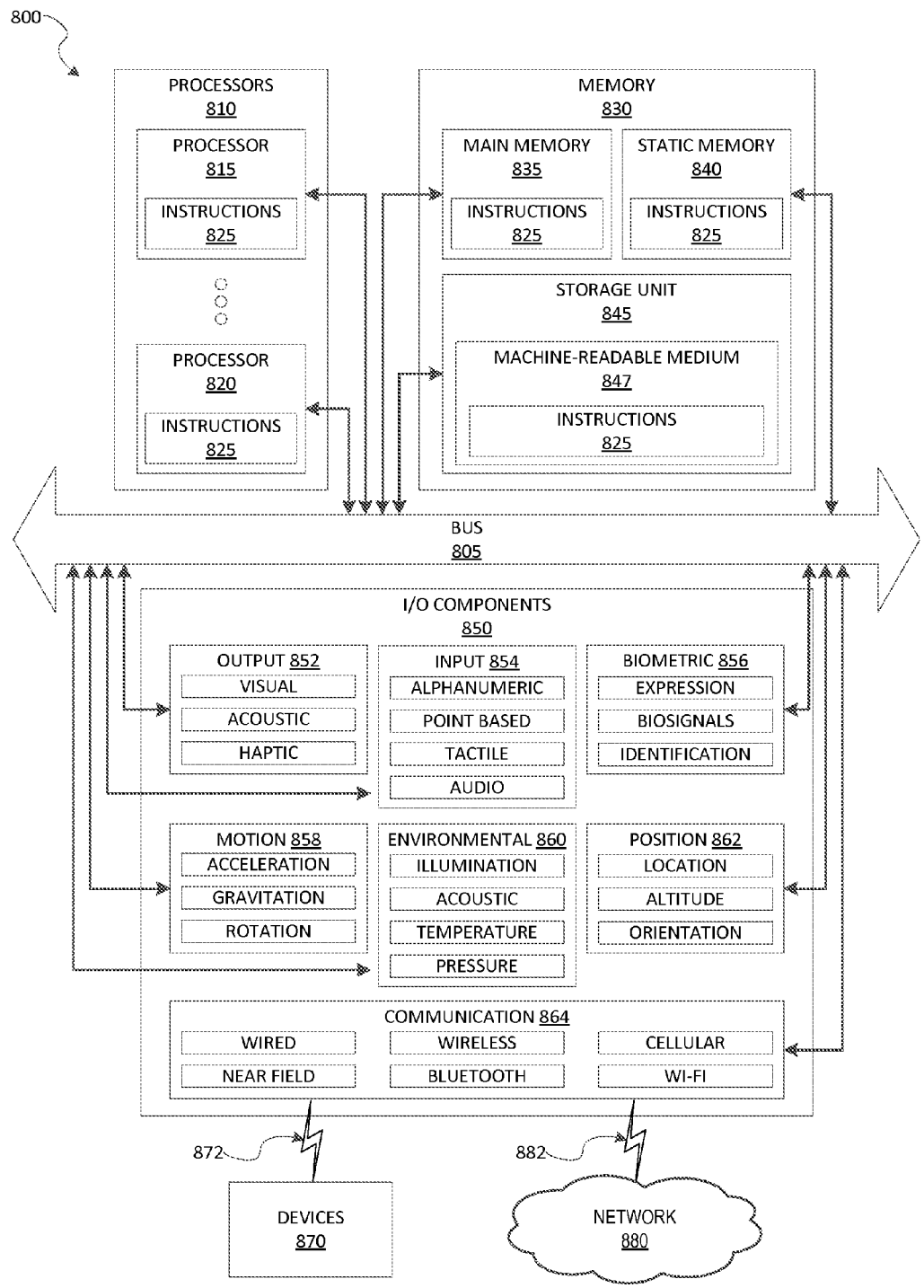
FIG. 8 is a block diagram illustrating components of a machine, according to some example embodiments.

FIG. 8 is a block diagram illustrating components of a machine 800, according to some example embodiments, able to read instructions from a machine-readable medium (e.g., a machine-readable storage medium) and perform any one or more of the methodologies discussed herein. Specifically, FIG. 8 shows a diagrammatic representation of the machine 800 in the example form of a computer system, within which instructions 825 (e.g., software, a program, an application, an applet, an app, or other executable code) for causing the machine 800 to perform any one or more of the methodologies discussed herein may be executed. In alternative embodiments, the machine 800 operates as a standalone device or may be coupled (e.g., networked) to other machines. In a networked deployment, the machine 800 may operate in the capacity of a computer system or a third-party system in a server-client network environment, or as a peer machine in a peer-to-peer (or distributed) network environment. The machine 800 may comprise, but be not limited to, a server computer, a client computer, a PC, a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 825, sequentially or otherwise, that specify actions to be taken by machine 800. Further, while only a single machine 800 is illustrated, the term "machine" shall also be taken to include a collection of machines 800 that individually or jointly execute the instructions 825 to perform any one or more of the methodologies discussed herein.

The machine 800 may include processors 810, memory 830, and I/O components 850, which may be configured to communicate with each other via a bus 805. In an example embodiment, the processors 810 (e.g., a CPU, a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, processor 815 and processor 820 that may execute instructions 825. The term "processor" is intended to include a multi-core processor that may comprise two or more independent processors (also referred to as "cores") that may execute instructions contemporaneously. Although FIG. 8 shows multiple processors 810, the machine 800 may include a single processor with a single core, a single processor with multiple cores (e.g., a multi-core process), multiple processors with a single core, multiple processors with multiples cores, or any combination thereof.

The memory 830 may include a main memory 835, a static memory 840, and a storage unit 845 accessible to the processors 810 via the bus 805. The storage unit 845 may include a machine-readable medium 847 on which are stored the instructions 825 embodying any one or more of the methodologies or functions described herein. The instructions 825 may also reside, completely or at least partially, within the main memory 835, within the static memory 840, within at least one of the processors 810 (e.g., within the processor's cache memory), or any suitable combination thereof, during execution thereof by the machine 800. Accordingly, the main memory 835, static memory 840, and the processors 810 may be considered as machine-readable media 847.

As used herein, the term "memory" refers to a machine-readable medium 847 able to store data temporarily or permanently and may be taken to include, but not be limited to, random-access memory (RAM), read-only memory (ROM), buffer memory, flash memory, and cache memory. While the machine-readable medium 847 is shown in an example embodiment to be a single medium, the term "machine-readable medium" should be taken to include a single medium or multiple media (e.g., a centralized or distributed database, or associated caches and servers) able to store instructions 825. The term "machine-readable medium" shall also be taken to include any medium, or combination of multiple media, that is capable of storing instructions (e.g., instructions 825) for execution by a machine (e.g., machine 800), such that the instructions, when executed by one or more processors of the machine 800 (e.g., processors 810), cause the machine 800 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory (e.g., flash memory), an optical medium, a magnetic medium, other non-volatile memory (e.g., Erasable Programmable Read-Only Memory (EPROM)), or any suitable combination thereof. The term "machine-readable medium" specifically excludes non-statutory signals per se.

The I/O components 850 may include a wide variety of components to receive input, provide and/or produce output, transmit information, exchange information, capture measurements, and so on. It will be appreciated that the I/O components 850 may include many other components that are not shown in FIG. 8. In various example embodiments, the I/O components 850 may include output components 852 and/or input components 854. The output components 852 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor), other signal generators, and so forth. The input components 854 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, and/or other pointing instrument), tactile input components (e.g., a physical button, a touch screen that provide location and force of touches or touch gestures, and/or other tactile input components), audio input components (e.g., a microphone), and the like.

In further example embodiments, the I/O components 850 may include biometric components 856, motion components 858, environmental components 860, and/or position components 862 among a wide array of other components. For example, the biometric components 856 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, finger print identification, or electroencephalogram based identification), and the like. The motion components 858 may include acceleration sensor components (e.g., accelerometer), gravitation sensor components, rotation sensor components (e.g., gyroscope), and so forth. The environmental components 860 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e g, infrared sensors that detect nearby objects), and/or other components that may provide indications, measurements, and/or signals corresponding to a surrounding physical environment. The position components 862 may include location sensor components (e.g., a GPS receiver component), altitude sensor components (e.g., altimeters and/or barometers that detect air pressure from which altitude may be derived), orientation sensor components (e.g., magnetometers), and the like.

Communication may be implemented using a wide variety of technologies. The I/O components 850 may include communication components 864 operable to couple the machine 800 to a network 880 and/or devices 870 via coupling 882 and coupling 872 respectively. For example, the communication components 864 may include a network interface component or other suitable device to interface with the network 880. In further examples, communication components 864 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 870 may be another machine and/or any of a wide variety of peripheral devices (e.g., a peripheral device coupled via a USB).

Moreover, the communication components 864 may detect identifiers and/or include components operable to detect identifiers. For example, the communication components 864 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF48, Ultra Code, UCC RSS-2D bar code, and other optical codes), acoustic detection components (e.g., microphones to identify tagged audio signals), and so on. In additional, a variety of information may be derived via the communication components 864 such as location via Internet Protocol (IP) geo-location, location via Wi-Fi® signal triangulation, location via detecting a NFC beacon signal that may indicate a particular location, and so forth.

Transmission Medium

In various example embodiments, one or more portions of the network 880 may be an ad hoc network, an intranet, an extranet, a virtual private network (VPN), a LAN, a wireless LAN (WLAN), a WAN, a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 880 or a portion of the network 880 may include a wireless or cellular network and the coupling 882 may be a Code Division Multiple Access (CDMA) connection, a Global System for Mobile communications (GSM) connection, or other type of cellular or wireless coupling. In this example, the coupling 882 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

The instructions 825 may be transmitted and/or received over the network 880 using a transmission medium via a network interface device (e.g., a network interface component included in the communication components 864) and utilizing any one of a number of well-known transfer protocols (e.g., hypertext transfer protocol (HTTP)). Similarly, the instructions 825 may be transmitted and/or received using a transmission medium via the coupling 872 (e.g., a peer-to-peer coupling) to devices 870. The term "transmission medium" shall be taken to include any intangible medium that is capable of storing, encoding, or carrying instructions 825 for execution by the machine 800, and includes digital or analog communications signals or other intangible medium to facilitate communication of such software.

Furthermore, the machine-readable medium 847 is non-transitory (in other words, not having any transitory signals) in that it does not embody a propagating signal. However, labeling the machine-readable medium 847 as "non-transitory" should not be construed to mean that the medium is incapable of movement; the medium 847 should be considered as being transportable from one physical location to another. Additionally, since the machine-readable medium 847 is tangible, the medium 847 may be considered to be a machine-readable device.

TERM USAGE

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method comprising:
    accessing first grammar data associated with a first grammar and second grammar data associated with a second grammar, wherein a grammar comprises one or more rules that define a programming language that corresponds to the grammar;
    determining from the first grammar data and the second grammar data whether the first grammar and the second grammar correspond to the same programming language, wherein determining whether the first grammar and the second grammar correspond to the same programming language includes:
        applying one or more transformational steps to both the first grammar data and the second grammar data;
        after each transformational step, determining whether the first grammar data and the second grammar data correspond;
        in accordance with a determination that the first grammar data and the second grammar data correspond, determining that the first grammar and the second grammar both correspond to the same programming language; and
        in accordance with a determination that the first grammar data and the second grammar data do not correspond, selecting a next transformational step in the one or more transformational steps, wherein prior to selecting the next transformational step:
            determining whether there are any remaining transformational steps, and
            in accordance with a determination that there are no remaining transformational steps, determining that the first grammar and the second grammar do not correspond to the same programming language.

2. The method of claim 1, wherein determining whether the first grammar and the second grammar correspond comprises determining whether the first grammar is an exact text correspond for the second grammar.

3. The method of claim 1, wherein the one or more transformational steps includes removing all actions from the first grammar data and the second grammar data.

4. The method of claim 1, wherein the one or more transformational steps includes sorting the rules in the first grammar data and the second grammar data alphabetically.

5. The method of claim 1, wherein the one or more transformational steps includes removing redundant parentheses from both the first grammar data and the second grammar data.

6. The method of claim 1, wherein the one or more transformational steps includes renaming all the rules in the first grammar data and the second grammar data according to a predetermined naming method.

7. The method of claim 1, wherein the one or more transformational steps includes sorting all deterministic alternatives in accordance with a predetermined sorting method.

8. The method of claim 1, wherein the one or more transformational steps includes two or more steps that are performed in a specific order.

9. The method of claim 1, further comprising, prior to applying one or more transformational steps to both the first and the second grammar, selecting one or more transformational steps to apply, wherein the selecting is based at least in part on a determination that two or more steps are performed in a specific order.

10. A system comprising:
    one or more processors configured to include:
    an accessing module to access first grammar data associated with a first grammar and second grammar data associated with a second grammar, wherein a grammar comprises one or more rules that define a programming language that corresponds to the grammar;
    a transformation module to determine from the first grammar data and the second grammar data whether the first grammar and the second grammar correspond to the same programming language, wherein determining whether the first grammar and the second grammar correspond to the same programming language includes:
        an application module to apply one or more transformational steps to both the first grammar data and the second grammar data;
        a corresponding module to, after each transformational step, determine whether the first grammar data and the second grammar data correspond;
        a comparison module, in accordance with a determination that the first grammar data and the second grammar data correspond, determine that the first grammar and the second grammar both correspond to the same programming language;
        a step selection module to, in accordance with a determination that the first grammar data and the second grammar data do not correspond, selecting a next transformational step in the one or more transformational steps, wherein prior to selecting the next transformational step:

a determination module to determine whether there are any remaining transformational steps, and a difference module to, in accordance with a determination that there are no remaining transformational steps, determine that the first grammar and the second grammar do not correspond to the same programming language.

11. The system of claim 10, wherein the comparison module further includes a determination module to determine whether the first grammar is an exact text correspond for the second grammar.

12. The system of claim 10, wherein the transformation module further includes a storing module to sort all deterministic alternatives in accordance with a predetermined sorting method.

13. A non-transitory computer-readable storage medium storing instructions that, when executed by the one or more processors of a machine, cause the machine to perform operations comprising:

accessing first grammar data associated with a first grammar and second grammar data associated with a second grammar, wherein a grammar comprises one or more rules that define a programming language that corresponds to the grammar;

determining from the first grammar data and the second grammar data whether the first grammar and the second grammar correspond to the same programming language, wherein determining whether the first grammar and the second grammar correspond to the same programming language includes:

applying one or more transformational steps to both the first grammar data and the second grammar data;

after each transformational step, determining whether the first grammar data and the second grammar data correspond;

in accordance with a determination that the first grammar data and the second grammar data correspond, determining that the first grammar and the second grammar both correspond to the same programming language; and in accordance with a determination that the first grammar data and the second grammar data do not correspond, selecting a next transformational step in the one or more transformational steps, wherein prior to selecting the next transformational step;

determining whether there are any remaining transformational steps, and in accordance with a determination that there are no remaining transformational steps, determining that the first grammar and the second grammar do not correspond to the same programming language.

14. The non-transitory computer-readable storage medium of claim 13, wherein determining whether the first grammar and the second grammar correspond comprises determining whether the first grammar is an exact text correspond for the second grammar.

* * * * *